BEST AVAILABLE COPY
J. LEE.
Petroleum Stove.
No. 3,146. Reissued Oct. 6, 1868.
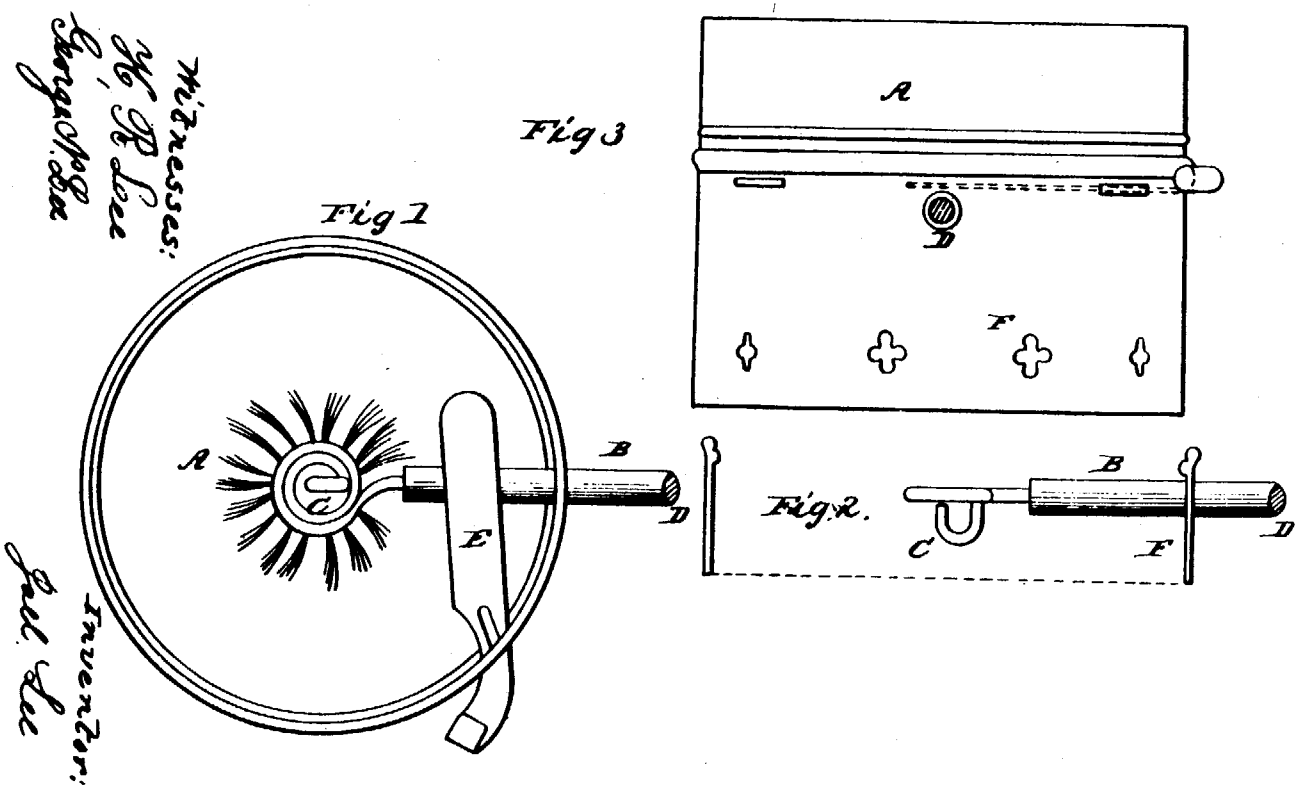
Witnesses:
H. R. Lee
George N. Lee
Inventor:
Jos. Lee
N. PETERS, Photo-Lithographer, Washington, D. C.

BEST AVAILABLE COPY

United States Patent Office.

JOEL LEE, OF GALESBURG, ILLINOIS.

*Letters Patent No.* 63,400, *dated April* 2, 1867; *reissue No.* 3,146, *dated October* 6, 1868.

IMPROVEMENT IN HYDROCARBON-BURNERS.

The Schedule referred to in these Letters Patent and making part of the same.

Be it known that I, JOEL LEE, of Galesburg, county of Knox, and State of Illinois, have invented a new and useful Improvement in Vapor-Burners, for illuminating and heating purposes; and I do hereby declare that the following is a full, clear, and exact description of the construction and operation of the same, reference being had to the annexed drawings, making a part of this specification, in which—

Figure 1 is a top view,

Figure 2 is a sectional view of conducting-tube and gas-generator.

Figure 3 is a perspective view.

A represents the article to be heated; B, the conducting-tube; C, the gas-generator; D, the packing; E, the adjustable radiator; F, the foundation or support.

The nature of my invention consists in packing the conducting-tube with wood of a porous nature; also in using a coiled gas-generator. The tube conducting the oil, such as benzole, benzine, gasoline, naphtha, or any other light oil, from the elevated tank to the gas-generator, is packed with elm, lynn, grape-vine, rattan, or any other wood of a porous nature, which serves to keep the oil from rushing too rapidly into the gas-generator, and prevent any impurities passing. The constant flow of oil may be shut off by a faucet.

The gas-generator is formed of a coiled tube, so arranged that the gas or vapor passes through its centre.

The adjustable radiator is so arranged that it can be turned over the jet of gas, when required, and dispensed with entirely when used for illuminating.

When used for heating, the adjustable radiator is turned over the jet, and remains there as a radiator, or it may be removed, and let the article being heated serve as a radiator. In this manner, the most intense heat is obtained.

To use my invention, apply heat to the coiled generator, by a lamp or lighted taper, until it is hot enough to generate gas, then let on the oil, and light the gas or vapor.

Having thus described my invention, what I claim, and desire to secure by Letters Patent, is as follows:

1. Packing the conducting-tube with wood, in the manner and for the purpose set forth.

2. A gas-generator, made of a coiled tube, and so arrranged that the gas or vapor passes through its centre, substantially as set forth.

Witnesses:

J. B. BOGGS,

M. HASKELL.

JOEL LEE.